(12) United States Patent
Peterson (10) Patent No.: US 6,369,839 B1
(45) Date of Patent: Apr. 9, 2002

(54) DATABASE INTERFACE MECHANISM

(75) Inventor: Richard Esty Peterson, San Francisco, CA (US)

(73) Assignee: Quintal Research Group, Pacifica, CA (US)

( * ) Notice: Subject to any disclaimer, the term of this patent is extended or adjusted under 35 U.S.C. 154(b) by 0 days.

(21) Appl. No.: 09/299,174

(22) Filed: Apr. 23, 1999

Related U.S. Application Data (60) Provisional application No. 60/082,916, filed on Apr. 24, 1998.

(51) Int. Cl.[7] .............................. G06F 3/14; G06F 7/06
(52) U.S. Cl. ........................ 345/835; 345/968; 707/100
(58) Field of Search ................................ 345/700, 764, 345/810, 835, 836, 837, 848, 968, 977; 707/100, 102, 104.1

(56) References Cited

U.S. PATENT DOCUMENTS

| | | | | |
|---|---|---|---|---|
| 4,859,187 A | * | 8/1989 | Peterson | .................... 434/118 |
| 5,359,724 A | * | 10/1994 | Earle | .......................... 707/205 |
| 5,452,468 A | * | 9/1995 | Peterson | ..................... 345/419 |
| 5,592,666 A | * | 1/1997 | Perez | .......................... 707/102 |

* cited by examiner

*Primary Examiner*—Crescelle N. dela Torre
(74) *Attorney, Agent, or Firm*—Richard Esty Peterson Patent Attorney

(57) ABSTRACT

A visual reference structure for a computer database for retrieval of information objects in the database, the reference structure is formed of discrete cell blocks that are assembled into a three dimensional structure having sixteen cubes containing one million cell blocks, seven plates containing one hundred thousand cell blocks, seven strings containing ten thousand cell blocks, seven cubes containing one thousand cell blocks, two plates containing one hundred cell blocks and a string of sixteen cell blocks, for a total of 16,777,216 cell blocks, the reference structure preferably providing locations for picoblocks which are bit cubes containing a maximum of $34^3$ bits, and being displayable in the display of a computer.

6 Claims, 14 Drawing Sheets

DATABASE INTERFACE MECHANISM

This application is based on Provisional Application Serial No. 60/082,916, filed on Apr. 24, 1998 pending.

BACKGROUND OF THE INVENTION

This invention is related to the subject matter of my U.S. Pat. No. 4,859,187, issued Aug. 22, 1989, entitled Database Management Enhancement Device, and my U.S. Pat. No. 5,452,468, issued Sep. 19, 1995, entitled, Computer System With Parallel Processing For Information Organization. The subject matter of this invention continues the theme that was set forth in a continuation-in-part application Ser. No. 08/191,981 to U.S. Pat. No. 5,452,468, and disclosure document No. 413732. The continuation-in-part application adds new matter to the original filing relating to a thousand cell cubic cell block and the introduction of a picoblock, which is a 32 bit by 32 bit by 32 bit data cube boxed in a 1 bit thick shell.

The invention here disclosed relates to a 3-dimensional cell structure for containing picoblocks. The cell structure is based on the number $2^{24}$, or 16,777,216. This moderately large number is useful for creating a conceptual meta structure that is easily visualized for location and storage of picoblocks. For example, each picoblock could represent an abstract of data from a separate U.S. patent. Similar data from foreign patents can be included, so that the structure can incorporate all indexed U.S. and foreign patents for location and retrieval in a scheme that is easily visualized and accessible to a novice user.

By maximizing the potential of the number $2^{32}$ which is used as the maximum address number in 32 bit word size in computer processing, we can consider the $2^{24}$ as a template and construct 256 of these template structures. In this manner, over four billion information objects can be classified and organized according to predefined attributes of the information, assigned to one of the 256 template structures, and located in the appropriate cell of the 16 million plus cell structure. This cell structure in its preferred incarnation is called a memory chalice.

SUMMARY OF INVENTION

The memory chalice is a conceptual interface mechanism for management and storage of memory objects. The memory chalice, so named because of the vague resemblance of the basic structure to a chalice, extends the theme of Mateo Ricci, the 16th century Jesuit, who created the "memory palace", as a repository for mental objects he wished to recall. Ricci's memory palace was in part devised, while he was a missionary in China, to learn Han pictographs.

The new concept for consideration is that information objects have innate charm, and that by qualifying and quantifying an object's natural charm, we can locate the object in a logical memory structure.

Our logical memory structures are expressions of big numbers significant in digital computing. First, our memory universe is based on the binary number $2^{32}$, which is more than 4 billion, giving us over four billion locations for storage of memory objects. Second, our universe is divided into four galaxies, each galaxy having 64 worlds. Each world in turn, is an expression of the binary number $2^{24}$, which gives us the more manageable number, 16,777,216, for building a memory palace. Finally, in constructing a symmetrical 3-D memory structure out of 16,777,216 perfect cubes, the memory palace takes the form of an hourglass or chalice. This memory chalice becomes the template for the 256 worlds in our memory universe.

If we accept the notion that objects having similar charm tend to hang out together, then a few well-placed archetype icons of charm will tend to influence the grouping and accumulation of other similarly charmed objects.

Charm is believed universal. Experience in collecting beach pebbles for stone mosaics teaches that this thing called "charm" attracts the eye and induces discriminating selection of one object among millions. The concept of charm can be similarly applied to information objects. The memory chalice then becomes a meta directory or universal index for locating memory objects.

In digital computing, the bit is the smallest element and is usually represented as a "1" or "0". While this makes the mathematician happy, it's tough to visualize. If instead we think of the bit as a perfect black or white cube, we can create boxes to contain these cubes. The one-size-fits-all box for objects in our memory chalice is called the picoblock.

Picoblocks are bit cubes 32 bits on a side wrapped in a one-bit thick shell. Charm in our universe is superficial and is carried in pictures, symbols and tags on the shell. Think of children's alphabet blocks with colored letters, numbers and animals on the six sides of each block.

Picoblocks are stashed in cell blocks, the basic storage container in the chalice structure for holding a picoblock. Cell blocks are assembled into alpha blocks, which are cubes of 1000 cell blocks, and beta blocks, cubes of 1,000,000 blocks.

Qualifying and quantifying an object's charm aids in the association of objects with objects and in the arrangement of objects in our object structure.

The devil is in the details and the details are in the drawings.

DETAILED DESCRIPTION OF THE PREFERRED EMBODIMENT

Figure 1:
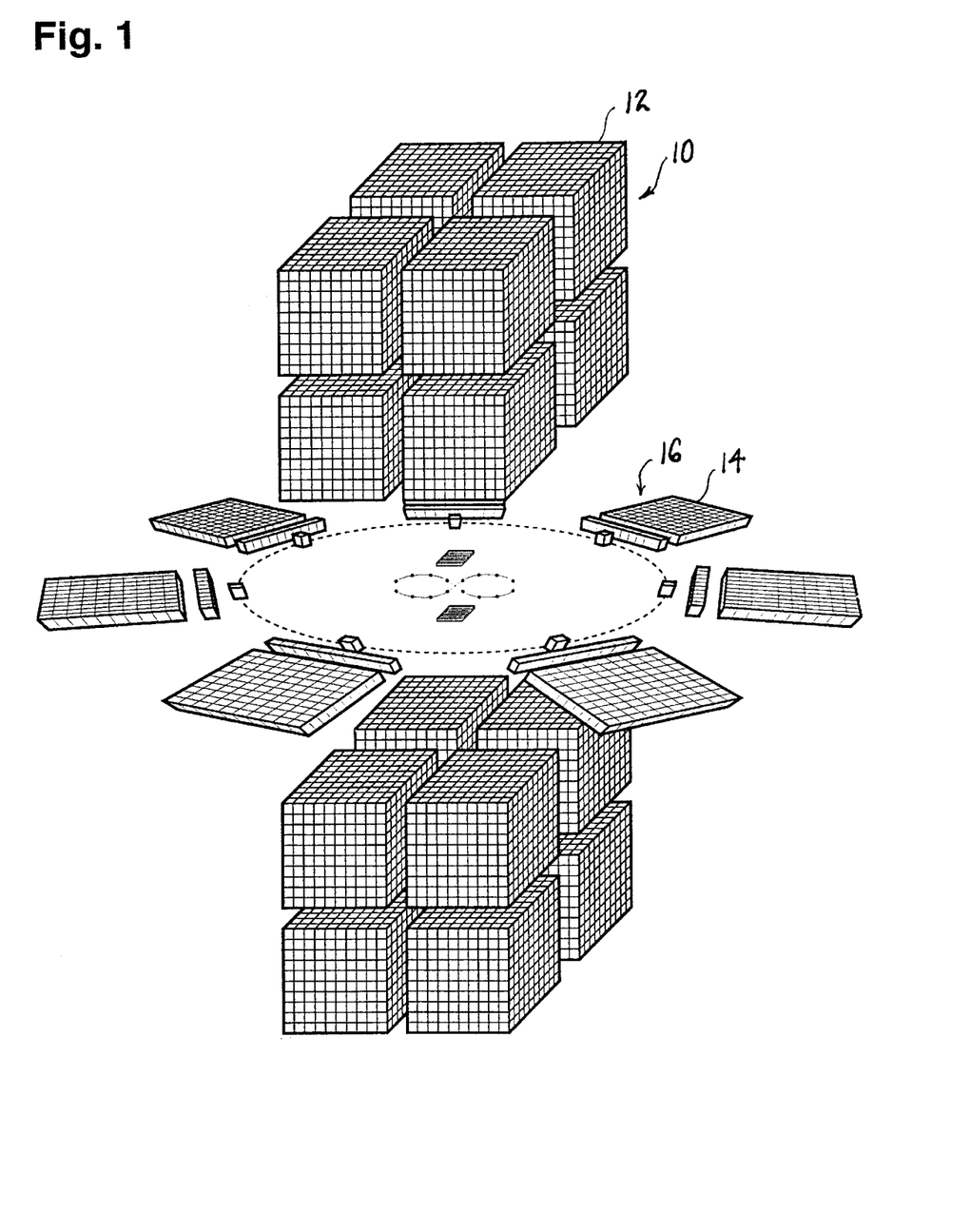
FIG. 1 is a perspective view of the basic information structure that provides a world view in an information universe.
Figure 3:
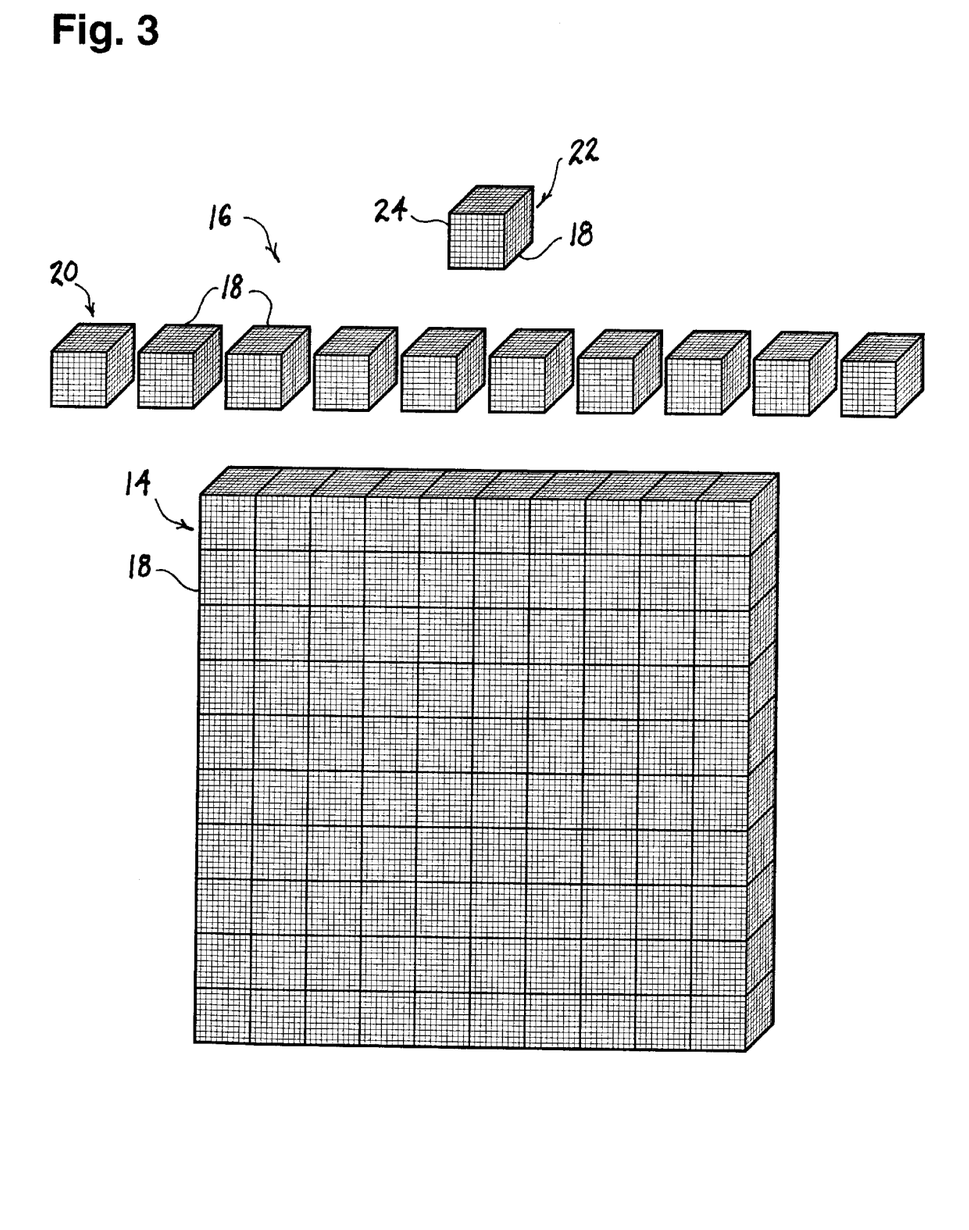
FIG. 3 is an enlarged view of one of seven server plate assemblies shown in FIG. 1.

Referring to FIG. 1, the preferred structure for forming a visual information mechanism is shown and designated by the reference numeral 10. The particular structure is designed to store 16,777,216 memory objects. A memory object is preferably a memory organizational package called a picoblock. The memory structure of FIG. 1, contains sixteen memory blocks 12 each having 1 million cells as shown in the enlarged view of a typical block, called a beta block in FIG. 4. The beta blocks 12 are memory banks utilized for deep or archival storage and are designed to be disassembled into typical plates 14 as shown for the seven circling plate assemblies 16 in the center of the information structure 10. An enlarged view of a plate assembly 16 is shown in FIG. 3.

Figure 6:
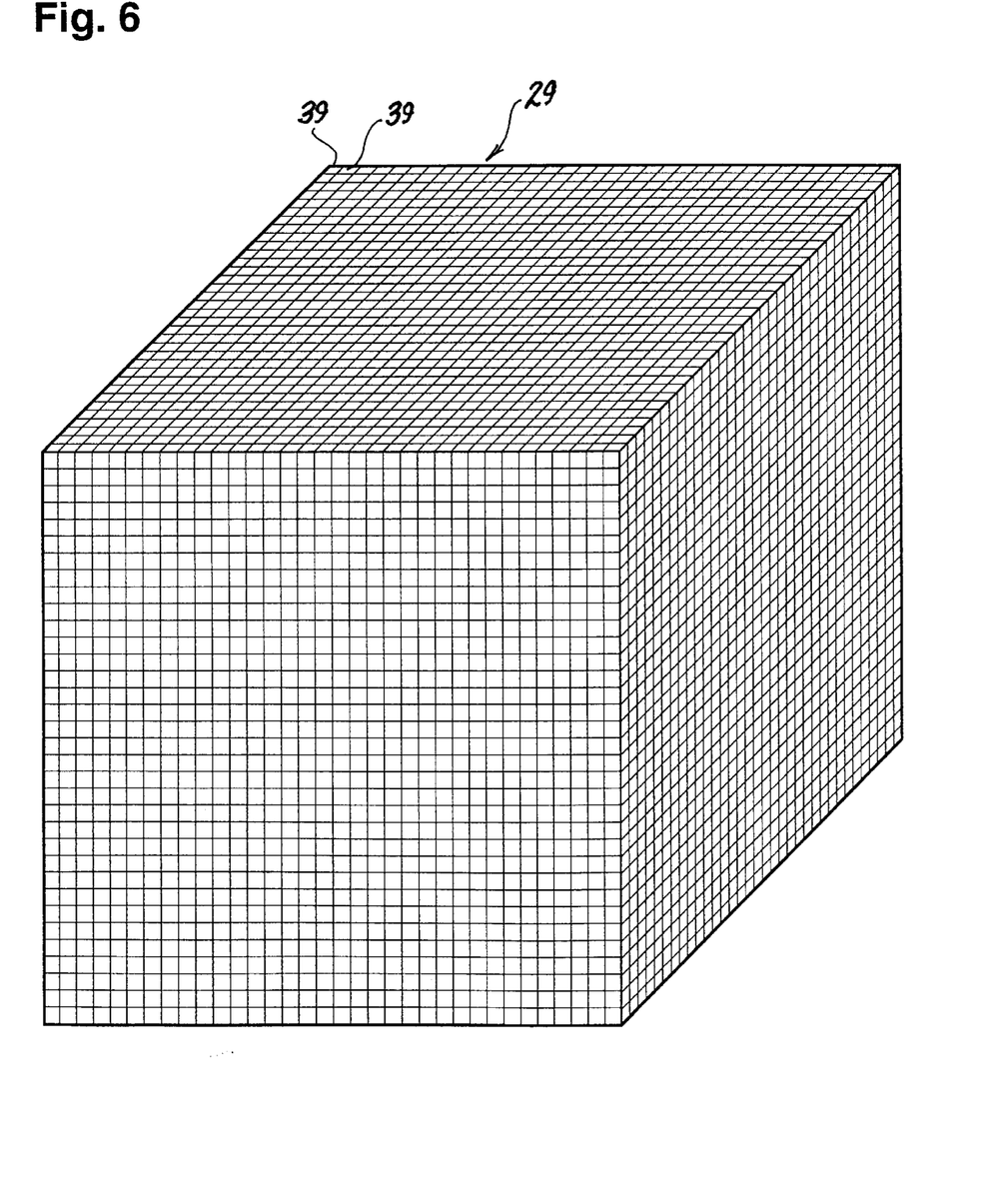
FIG. 6 is a perspective view of a picoblock formed of a cube of bit blocks.

The plate assemblies each include a 10×10 matrix of alpha blocks 18, each plate 14 thereby having one hundred alpha blocks 18. Each plate assembly 16 also includes a string 20 of alpha blocks and a lead alpha block 22, the assembly forming a contingent of one hundred eleven alpha blocks. In this manner, the seven assemblies provide 777,000 cell blocks 24 for containing a like number of picoblocks. It is to be understood that a cell block 24 is one of the thousand cells making up an alpha block 18. A picoblock is cube of bits represented as small black or white cubes assembled into a block as shown in FIG. 6.

Figure 5:
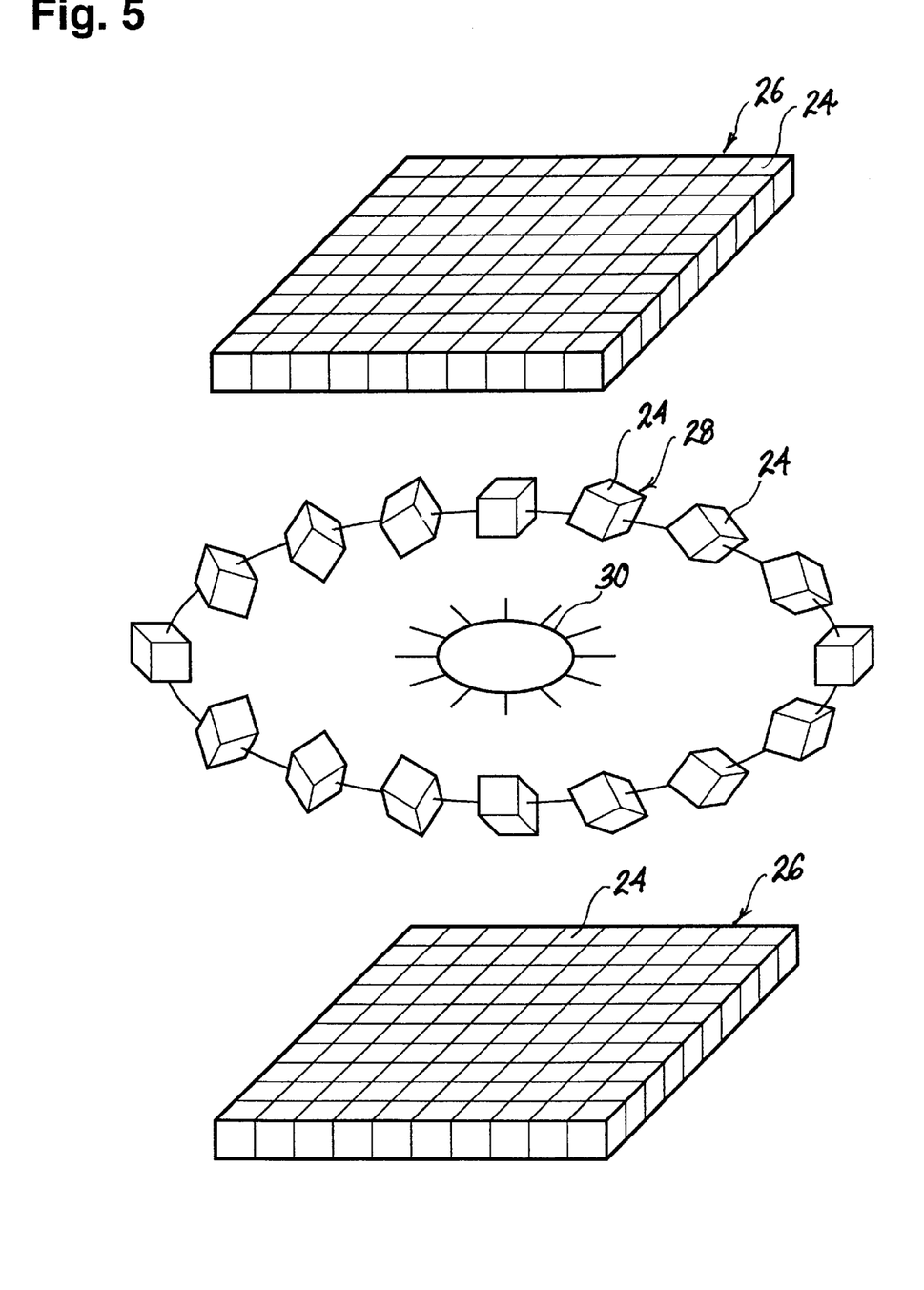
FIG. 5 is an enlarged perspective view of two central collector plates and sixteen independent cell blocks shown in FIG. 1.

Finally, at the center of the information structure 10 is a pair of collector plates 26 and a string of selector blocks 28, shown in the enlarged view of FIG. 5. The collector plates 26 and string of selector blocks 28 are made up of cell blocks 24. Each cell block 24 in the information structure is sized to contain a picoblock 29, the selected kernal of this iteration of the information system. In FIG. 5, the structure is also shown with a time wheel 30, to remind the reader that this is a dynamic system and in part dependent on time to determine the state of the information structure.

Figure 2A:
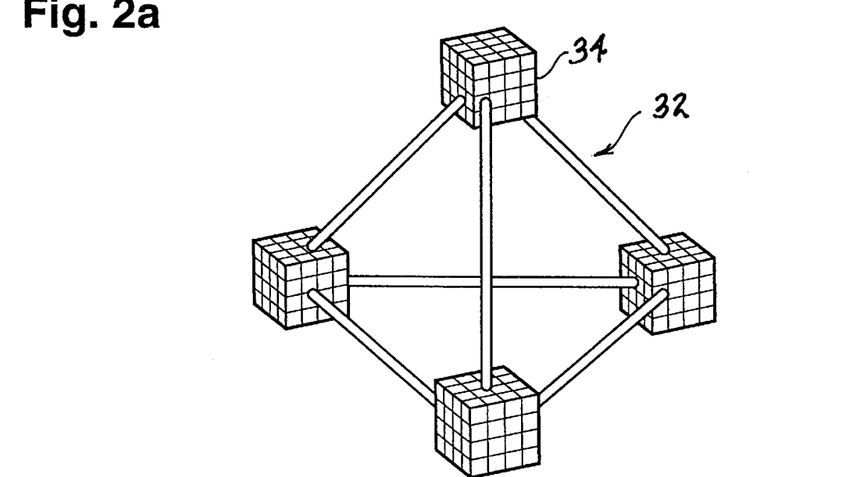
FIG. 2a is a perspective view of an information structure showing a universe with 4 galaxies, each galaxy having 64 worlds.
Figure 2B:
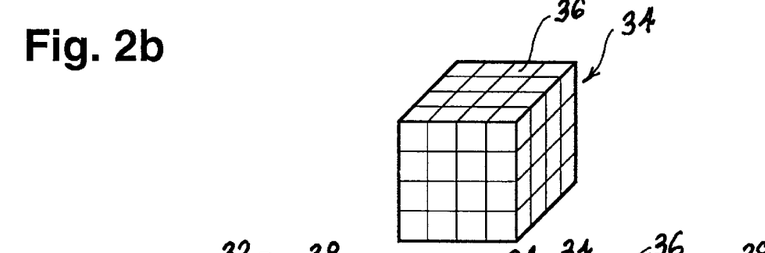
FIG. 2b is a perspective view of one of the galaxies of 64 worlds.
Figure 2C:
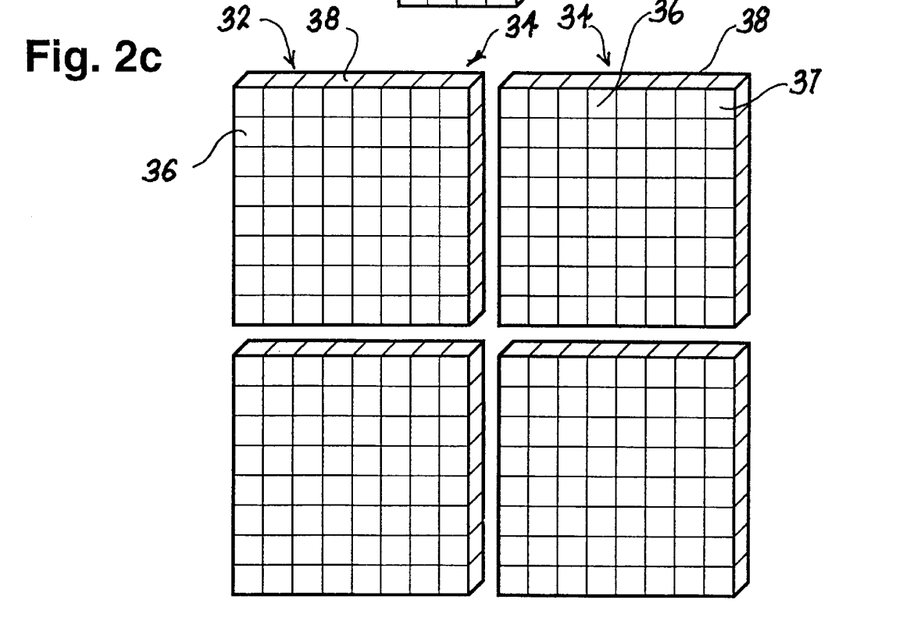
FIG. 2c is a perspective view with each galaxy unfolded to show a total of 256 worlds.

Referring now to FIGS. 2a to 2c, a schema is shown for multiplying the number of standard information structures 10, as shown in FIG. 1, to utilize the full compliment of available addresses in the number $2^{32}$. In this manner, FIG. 2a shows a universe 32 divided into four galaxies 34, the composite taking the form of a tetrahedron. Each corner or node of the tetrahedron has a galaxy 34, shown in greater detail in FIG. 2b that is made up of 64 worlds 36. If each of the four galaxies is unfolded, as shown in FIG. 2c, then the four galaxies can be displayed as plates 38 with a total of 256 worlds. In this manner, each of the cells comprising a world 36 forms a window to a memory chalice 10, as shown in FIG. 1.

Notably, each of cell plates 38 forming an unfolded galaxy 34, comprises an 8×8 structure that is common to the structure of the chess board and checker board. The schema of information organization is thereby intimately tied to game playing. The field configuration is displayed as a composite or selective accessing window for accessing one of the 256 available worlds.

Figure 4:
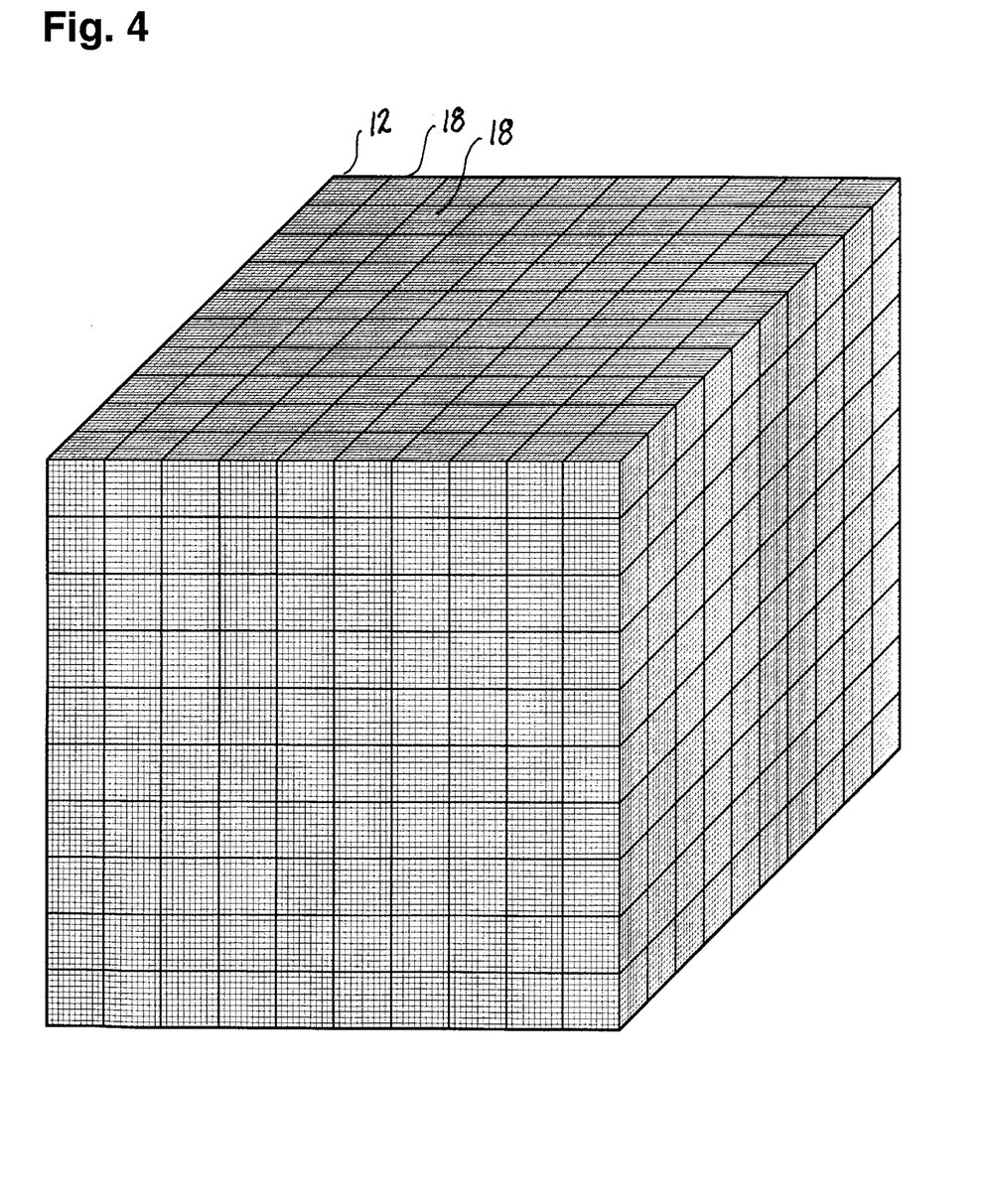
FIG. 4 is an enlarged perspective view of one of sixteen large data blocks shown in FIG. 1.

It is to be noted that the information system of this invention is primarily constructed for 32-bit processors, but may be equally scaled to 64 bit processors with advantage. As noted, the standard information block to be lodged in each one of the cell blocks 24 detailed in FIGS. 3 to 5 is the picoblock 29 shown in FIG. 6. The picoblock 29 is a cube of bits 39. If we think of bits as black or white dice instead of "one's" and "zero's", then visual structures can be constructed by a grouping of the bit cubes. If the preferred structures are cubes, then structures can be formed that contain a large block of bits arranged in a compact form. The picoblock 29, is a cube of bits, 34 by 34 by 34. This structure is selected to provide a one bit address and tagging shell around a data cube that measures 32 bits by 32 bits by 32 bits.

Figure 7:
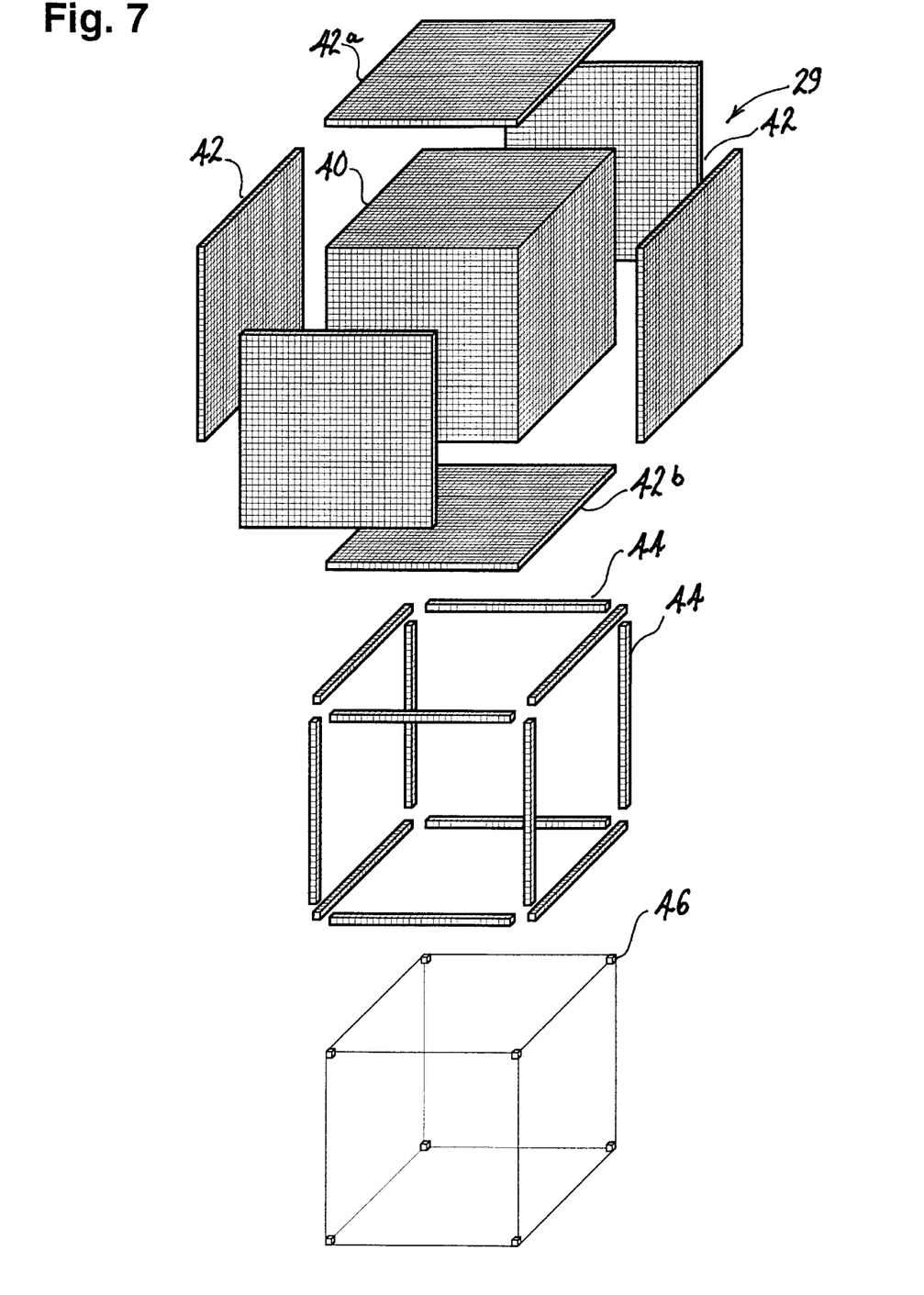
FIG. 7 is an exploded view of the picoblock of FIG. 6.

Referring to the exploded view of FIG. 7, the structure of the picoblock 29 can be better perceived. The picoblock 29 includes the core data cube 40, six plates measuring 32 bits by 32 bits twelve edge strings 44, 32 bits in length, and eight corner bits. In 32-bit programming, it is preferred that at least four picoblocks be grouped together in order that the eight corner bits can be combined and fill out a complete 32 bit word.

Figure 8:
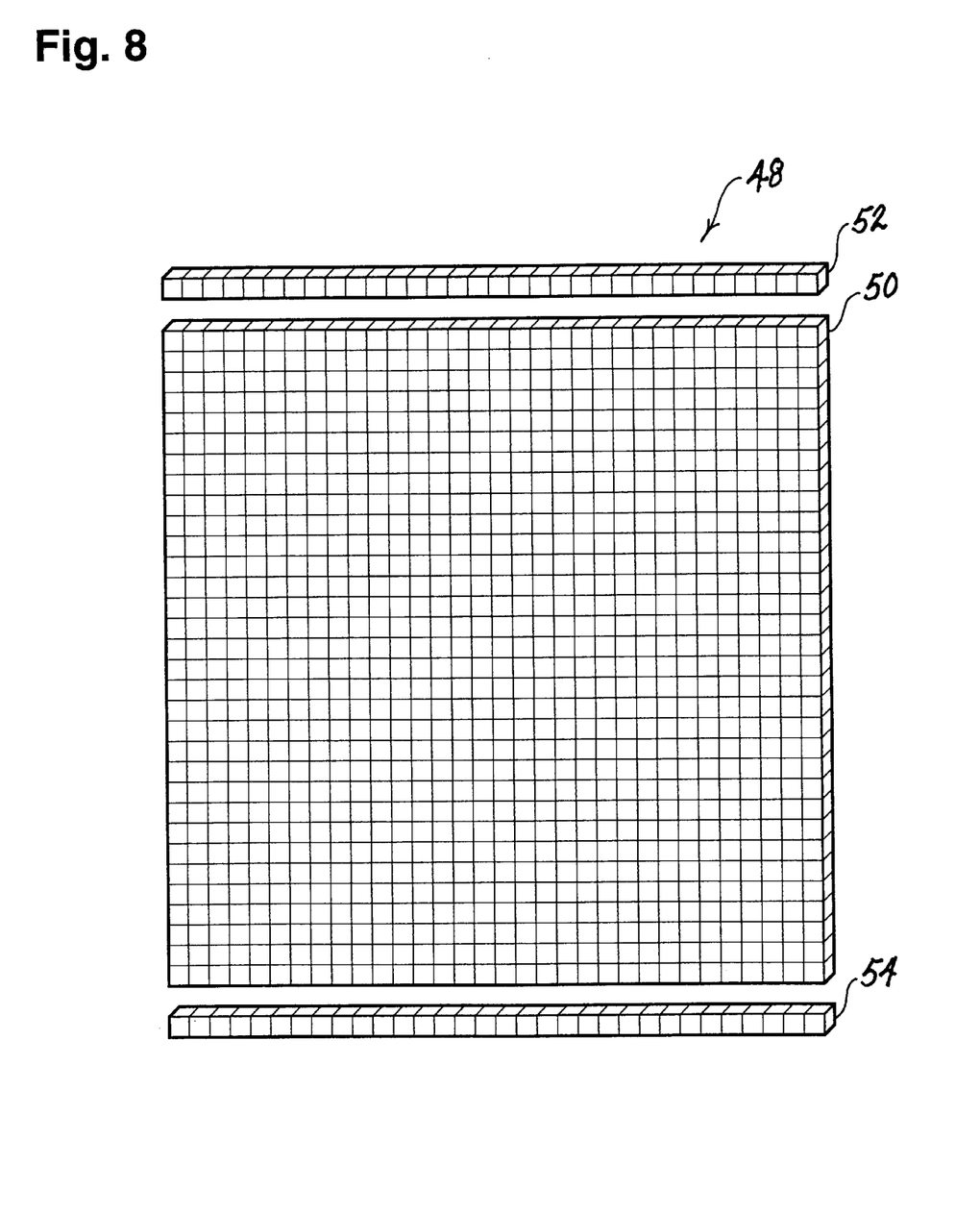
FIG. 8 is a perspective view of a bit tablet formed of a bit plate and a bit string as a header and a trailer to the bit plate.

In another scheme for understanding and analyzing a picoblock 29, the picoblock can be sliced to provide number of tablets 48, as shown in FIG. 8. The tablet is a bit plate 50 measuring 32 bits by 32 bits with a bit string 52 of 32 bits arranged as a header, and a bit string 54 of 32 bits arranged as a trailer. If we attempt to divide the picoblock into tablets, then we must dedicate two of the exploded plates in FIG. 7, for example, the top and bottom plates 42a and 42b as the headers, and trailers for the data cube. The other four plates in the exploded picoblock 29 utilize the edge strings 44 as headers and trailers of the plates 42 with the extra edge strings 44 providing two extra headers 56 and two extra trailers 58 on the first and last tablet.

Figure 9A:
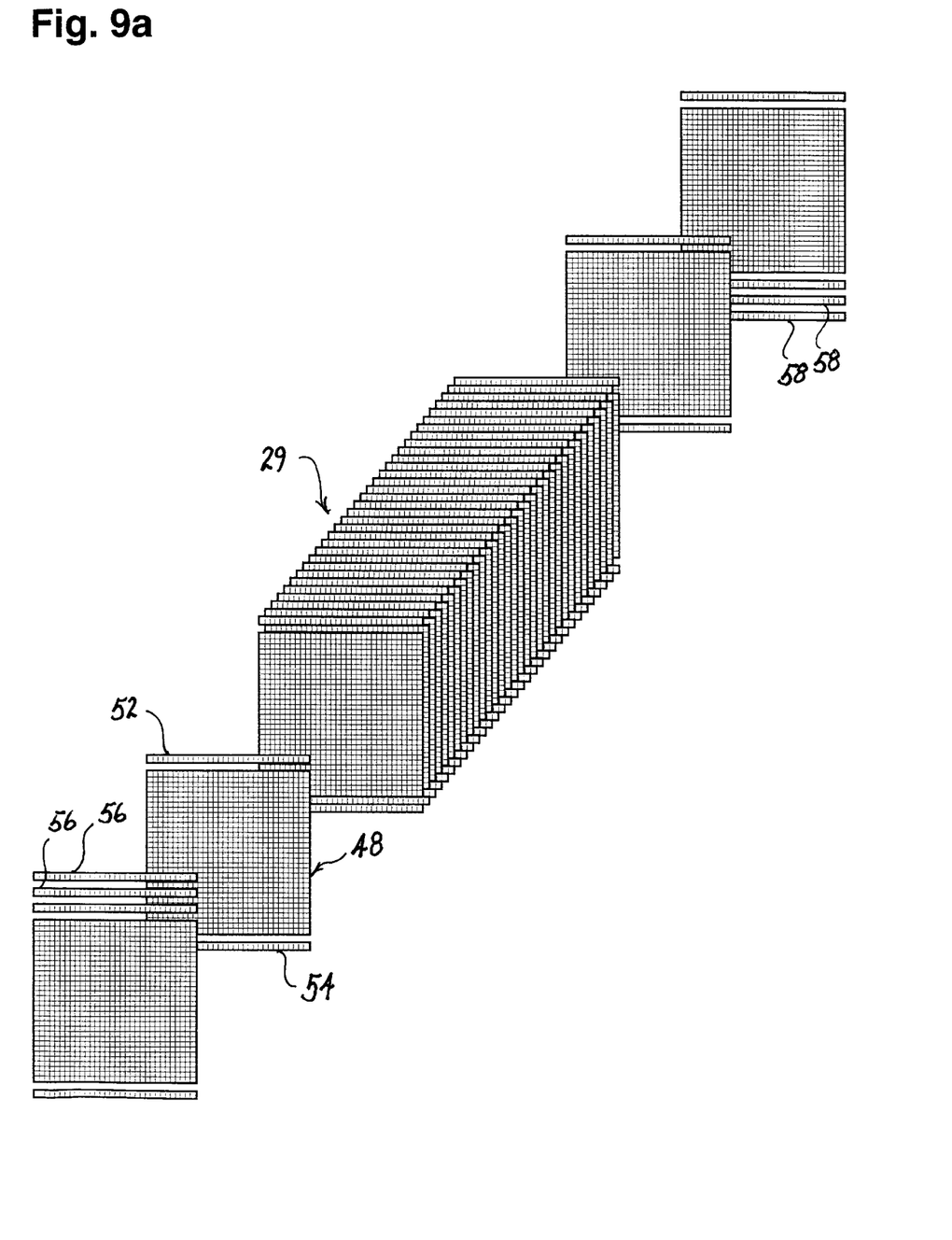
FIG. 9a is a perspective, schematic view of a picoblock broken into tablets.

It is to be understood that for a data container, the protocol can utilize all or none of the plates 50 and be confined to the headers 52 and trailers and/or the two extra headers 56 and two extra trailers 58 of the picoblock 29 as shown in FIG. 9a. In this manner, the picoblocks can be considered to be a number of tablets, the maximum number being thirty six. The tablet can contain data, a black and white bit map, part of a pixel, or code instructions.

Figure 9B:
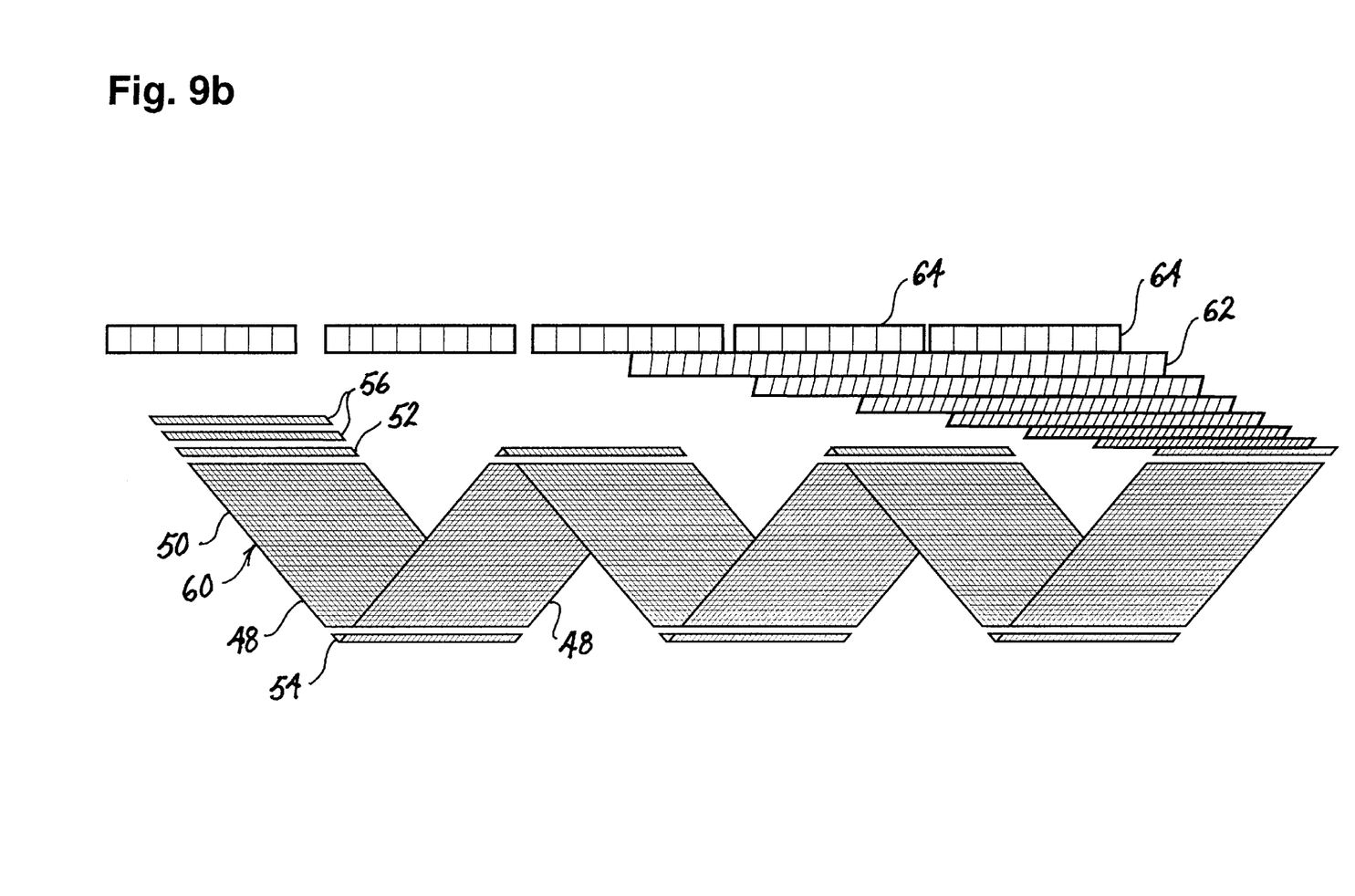
FIG. 9b is a perspective schematic view of the picoblock broken into connected tablets and showing one scheme for transforming the tablets into a byte stream.

For transmitting the picoblock 29, the tablet system can be read top to bottom in a typical 32 bit processor as shown in FIG. 9a, or by connecting the tablets 48 head to tail in the scheme shown in FIG. 9b. In this scheme the picoblock ribbon 60 is shown breaking up into separate 32-bit words 62 and subsequently into 8-bit bytes 64 for conventional digital byte transmission.

Figure 10:
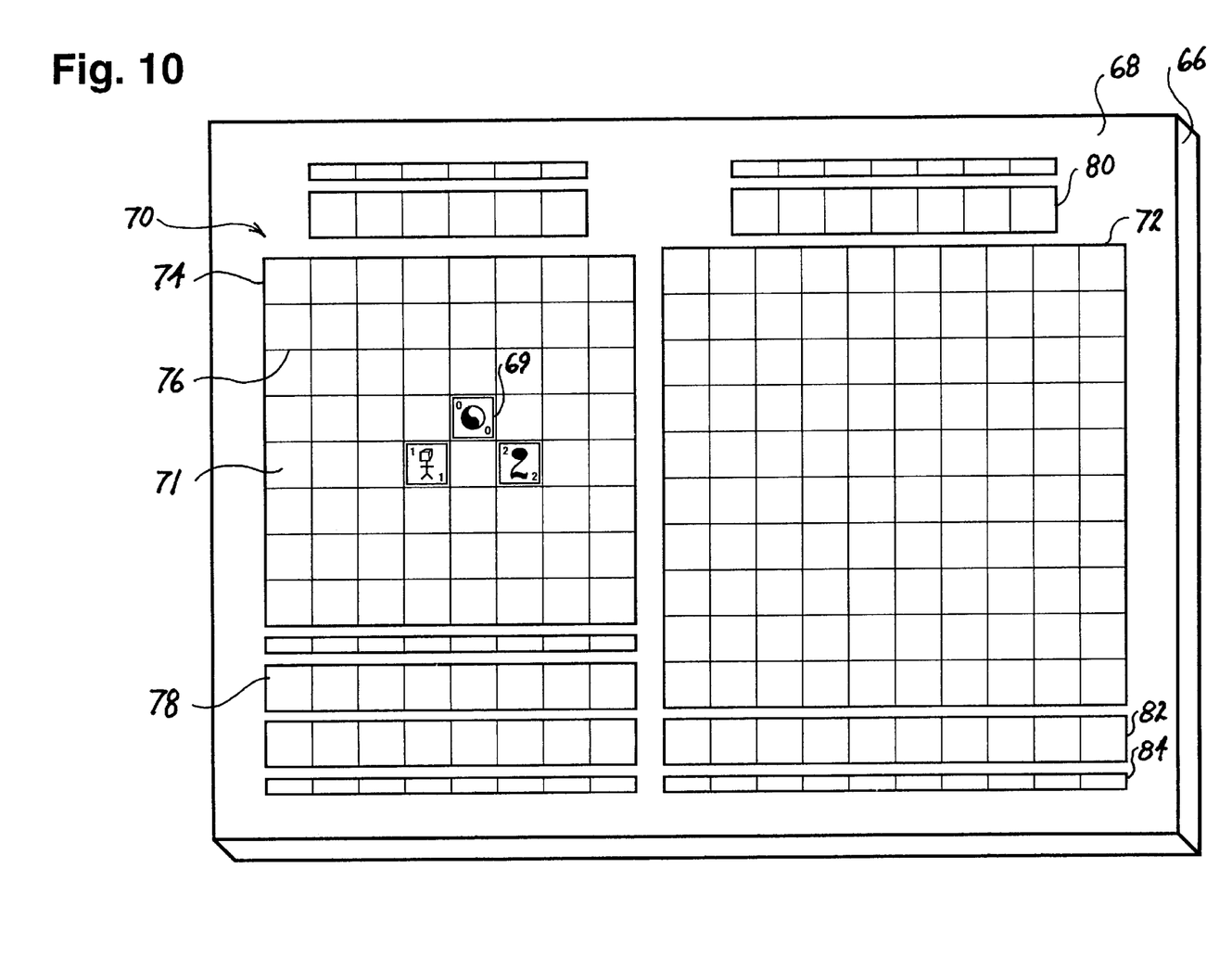
FIG. 10 is a schematic view of a computer and screen showing a standard template layout for selecting, displaying and collecting picoblocks.

As shown in the schematic view of FIG. 10, a digital computer 66 has a screen 68 with a screen template 70 showing a 10×10 field 72 and an 8×8 field 74. Typically, icons 69 representing a picoblock appear in the apertures 71 of the fields. It is to be understood that the grid lines 76 can disappear when a group of pictographs in a mosaic merge into a composite image. In addition to the two fields 72 and 74, are a series of scroll bars 70 to provide for selection of graphically marked picoblocks in the manner described in the referenced patents. Preferably the scroll bars 78 are included to provide aperture sets according to the important 6, 7, 10 and 16 numbers that are significant in the structure of FIG. 1. For example, the seven aperture set 80 can relate to the seven server plate assemblies 16, and the 10 aperture set 82 can relate to the string 20 of ten alpha blocks in the plate assemblies, etc. The rectangular buttons 84 are controls for scrolling the aperture proximate the button for selective display of a picoblock icon or graphic.

Figure 11:
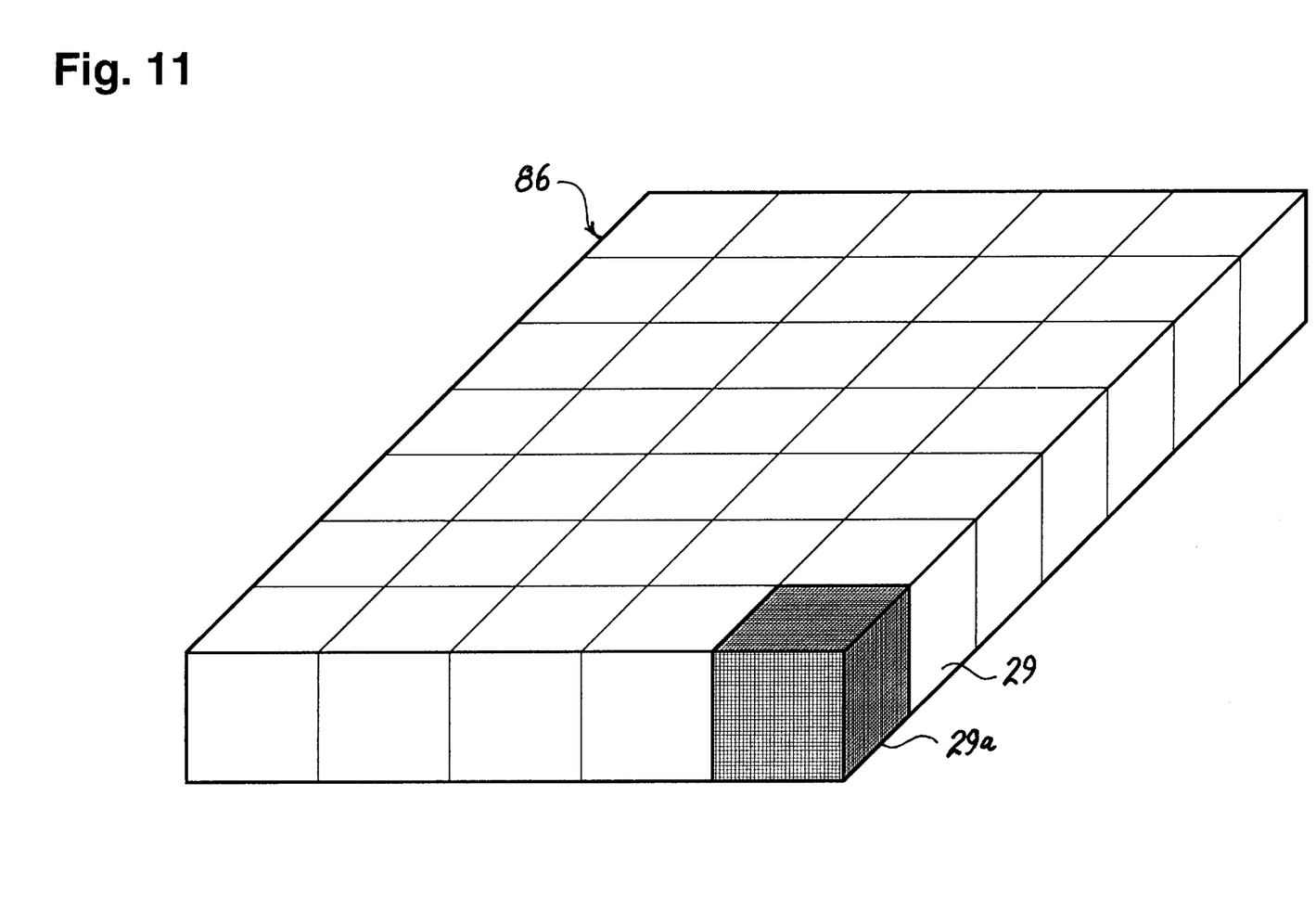
FIG. 11 is a schematic view of a grouping of picoblocks into a hypercard.

Referring to FIG. 11, picoblocks 29 can be assembled into a typical hypercard 86, that is much like a trading card having a standard 5×7 aspect ratio. In FIG. 11 is shown an array of picoblocks with one of the blocks 29a detailed to show the actual bit composition. Typically the hypercard is shown in the 8×8 field or window with the 10×10 field or window reserved for selecting icons representative of proposed arrangement or grouping of picoblocks in the information structure.

It is contemplated that the 10×10 array of picoblocks are stacked ten high as a thousand cell alpha block and assigned to one of the seven alpha block assemblies 16 shown in FIG. 1. The alpha block assemblies act as server plates to provide a cache for temporary storage of information before being deposited into one of the deep memory banks of the beta blocks 12. Considering the collector plates 26 and server plate assemblies 16 as caches, it is to be understood that the archival storage of the deep memory beta blocks is limited to 16,000,000 objects. Because the picoblock 29 is limited in size, it is also to be understood that the picoblock can contain the necessary tags and code to link the picoblock to other memory sources for accessing binary large objects.

Figure 12:
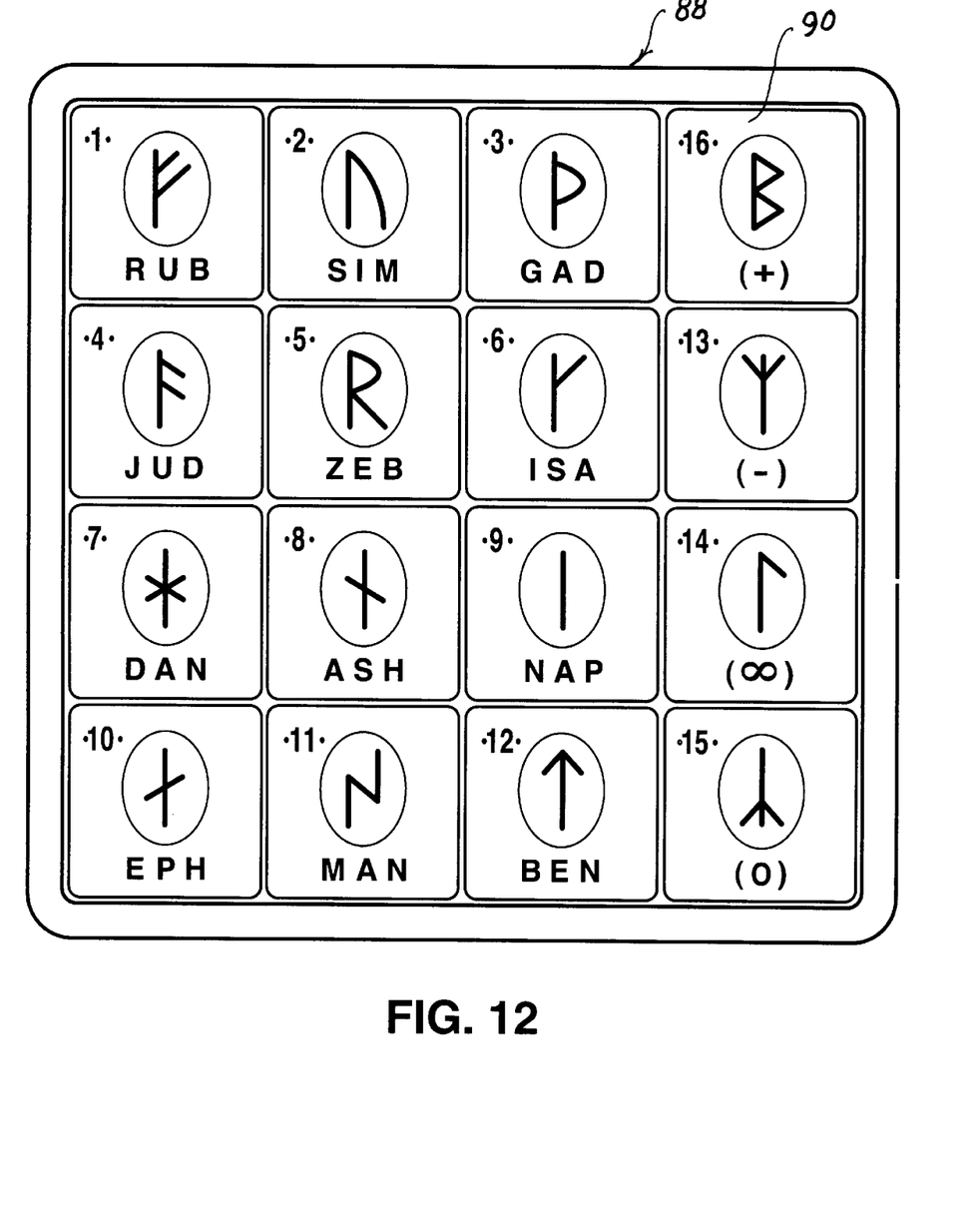
FIG. 12 is a schematic view of a gallery of exemplar selector blocks having an alphanumeric and color codex.

Referring to FIG. 12, a suggested codex 88 is provided for initial categorization of information. The codex 88 is a simplistic combination of icons 90 labeled with the 16 letters the shortened Scandinavian runes, supplementing the 12 stones of the breastplate of Aaron, likely assigning colors to the 12 tribes of Israel. Notably, this is one of the first color codes, as the banner of each tribe was apparently adorned with a corresponding color and symbol that represented the tribe. Unfortunately, the precise order and identity of the stones has been lost and the assemblage shown is simply a best effort from available references.

Figure 13:
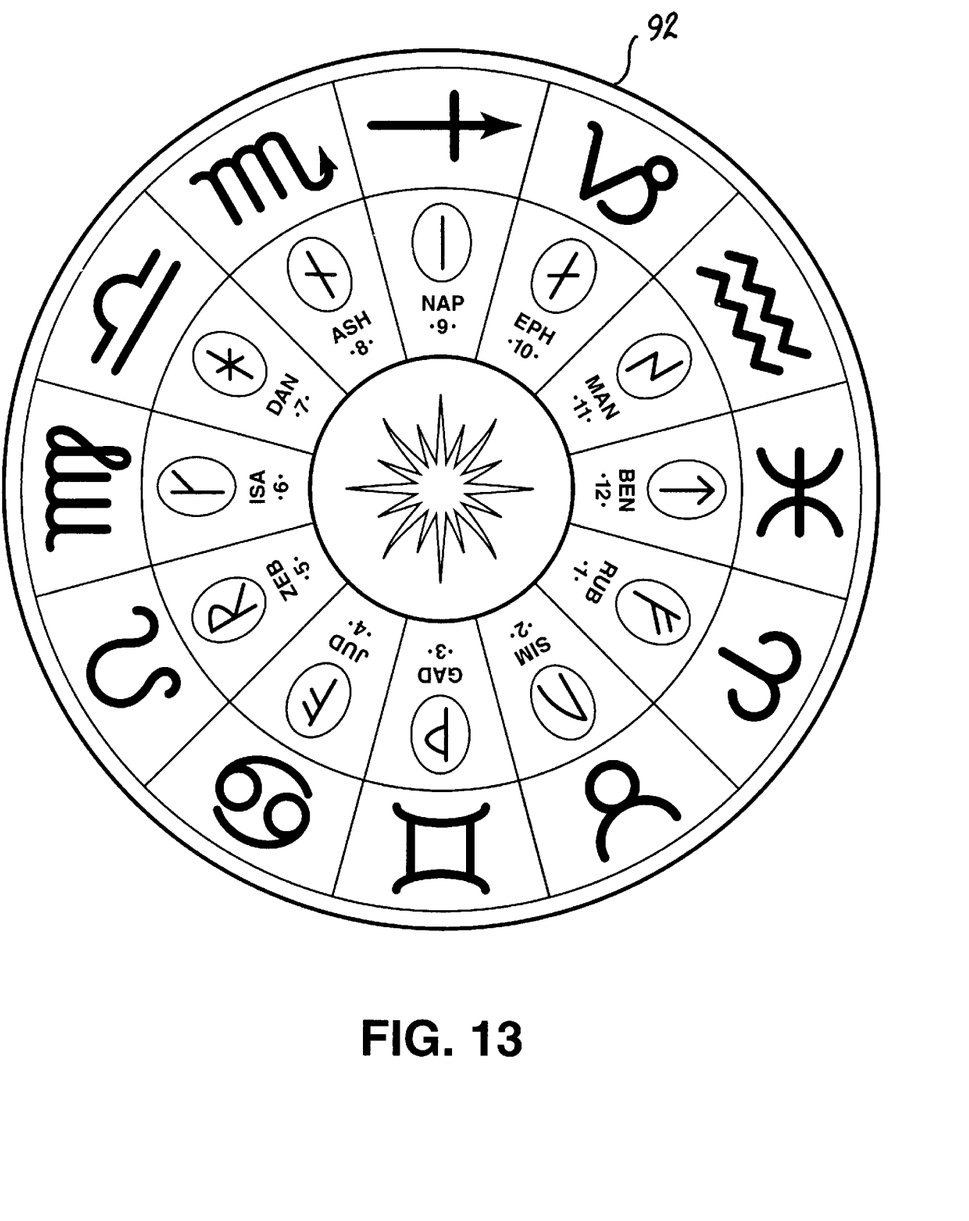
FIG. 13 is a schematic view of a color spectrum time wheel with a codex utilizing certain of the selector block elements of FIG. 12.

Similarly, FIG. 13 is an association of the 12 color coded stones of FIG. 12 with a standard color-coded astrological wheel 92. The astrological wheel is symbolic of the division of a circle into 12 sectors for temporal classification. Nothing more is suggested by these categorical assignments than a good default starting place for classification. It is understood that the information system provided in this specification has a Western bias and is typically Cartesian in nature to satisfy orthodox information organization. It is expected that the particular system of visual cues adopted for organizing information in the information structure can be tailored to the user's inclination or culture. The chalice structure itself is universal being based on a binary number.

What is claimed is:

1. In a database of a computer having a plurality of discrete identifiable information objects, a visual reference structure displayable by a computer display for locating information objects for retrieval wherein the visual reference structure includes uniform, cubic cell blocks wherein discrete information objects are virtually locatable in discrete cell blocks, the reference structure having sixteen cubes of one million cell blocks, seven plates of one hundred thousand cell blocks, seven strings of ten thousand cell blocks, seven cubes of one thousand cell blocks, two plates of one hundred cell blocks and a string of sixteen cell blocks wherein $2^{24}$ virtual locations for information objects are provided.

2. The visual reference structure of claim 1 wherein a screen template is displayable by the computer display and the screen template includes grid lines forming squares for display of icons representing information objects.

3. The visual reference structure of claim 2 wherein the squares represent cell blocks in the visual reference structure.

4. The visual reference structure of claim 1 wherein information objects are represented as picoblocks wherein a picoblock is a visual reference structure for data bits.

5. The visual reference structure of claim 1 wherein each cell block has an identifiable memory address and each information object has a discrete identity wherein the information objects are locatable in the reference structure by an address that is associated with an object identity.

6. The visual reference structure of claim 1 wherein a reference system is comprised of 256 reference structures wherein $2^{32}$ locations for information objects are provided.

* * * * *